Oct. 11, 1960

R. E. BURT 2,955,301

TOOL FOR DEFORMING THE CONICAL EXTENSION
OF A NUT TO RENDER THE NUT SELF-LOCKING

Original Filed Oct. 23, 1956

INVENTOR.
Russell E. Burt
BY
Harness, Dickey & Pierce
ATTORNEYS.

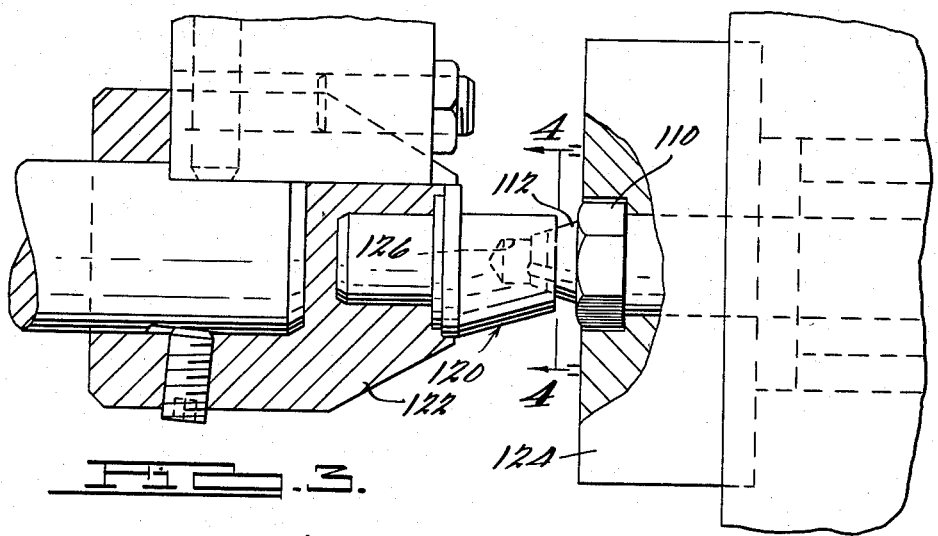
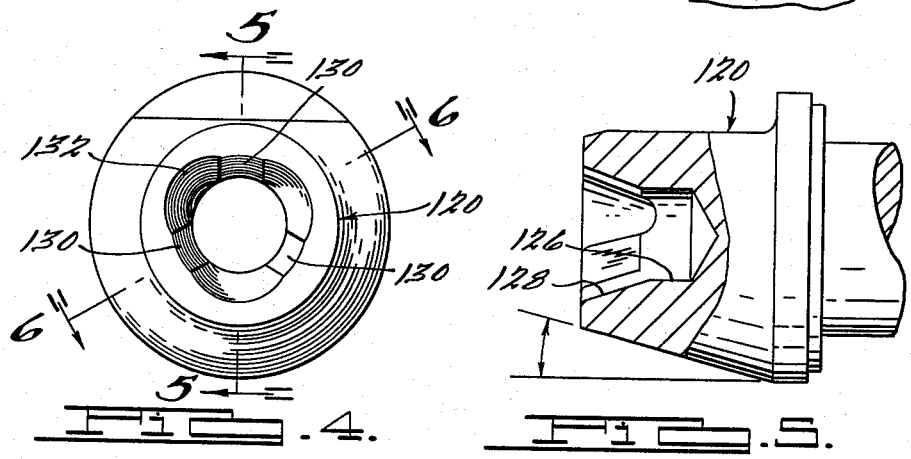
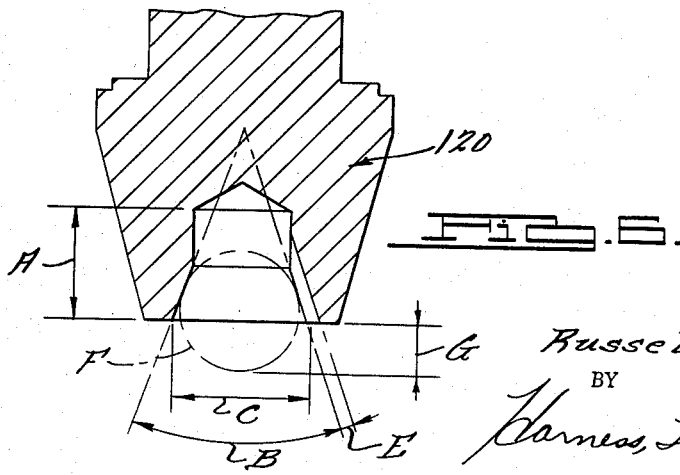

United States Patent Office 2,955,301
Patented Oct. 11, 1960

2,955,301

TOOL FOR DEFORMING THE CONICAL EXTENSION OF A NUT TO RENDER THE NUT SELF-LOCKING

Russell E. Burt, Utica, Mich., assignor to National Machine Products Company, Utica, Mich., a corporation of Michigan Original application Oct. 23, 1956, Ser. No. 617,763. Divided and this application Oct. 31, 1957, Serial No. 693,760

2 Claims. (Cl. 10—72)

This invention relates to self-locking nuts and, more particularly, to an improved tool for making self-locking nuts of the prevailing torque type. This application is a division of the applicant's co-pending application, Serial No. 617,763, filed October 23, 1956.

An object of the invention is to provide an improved tool for making self-locking nuts of the type which provide a prevailing torque locking action between the nut and a mating threaded member.

Another object of the invention is to provide an improved tool for making an improved self-locking nut whereby a locking action is effected between the nut and a mating threaded member over a relatively large circumferential area of the mating threads.

Another object of the invention is to provide an improved tool for making self-locking nuts that is economical to manufacture, durable, efficient and reliable in operation.

Another object of the invention is to provide an improved tool for making self-locking prevailing torque-type nuts having a plurality of circumferentially spaced locking sectors provided with thread surfaces extending in an arc substantially concentric with but on a smaller radius than the arc of the unaltered portions of the thread of the nut and separated by radially outwardly displaced relief sectors providing clearance space for the metal of the locking sectors when placed under compression whereby detrimentally high frictional contact or torque is avoided.

Still another object of the invention is to provide an improved tool which reduces the cost of manufacturing self-locking nuts of the indicated character.

The above as well as other objects and advantages of the present invention will become apparent from the following description, the appended claims and the accompanying drawings, wherein:

Figure 3 is a fragmentary view of apparatus for making the nut illustrated in Figs. 1 and 2;

Figure 4 is an end view of the forming tool head as seen on line 4—4 of Fig. 3;

Figure 5 is a fragmentary elevational view, with portions in section, of the tool head illustrated in Fig. 4; and Figure 6 is an axial sectional view of the tool head illustrated in Fig. 4, taken on the line 6—6 thereof, and illustrating certain angles and factors found to be of practical value.

Figure 1:
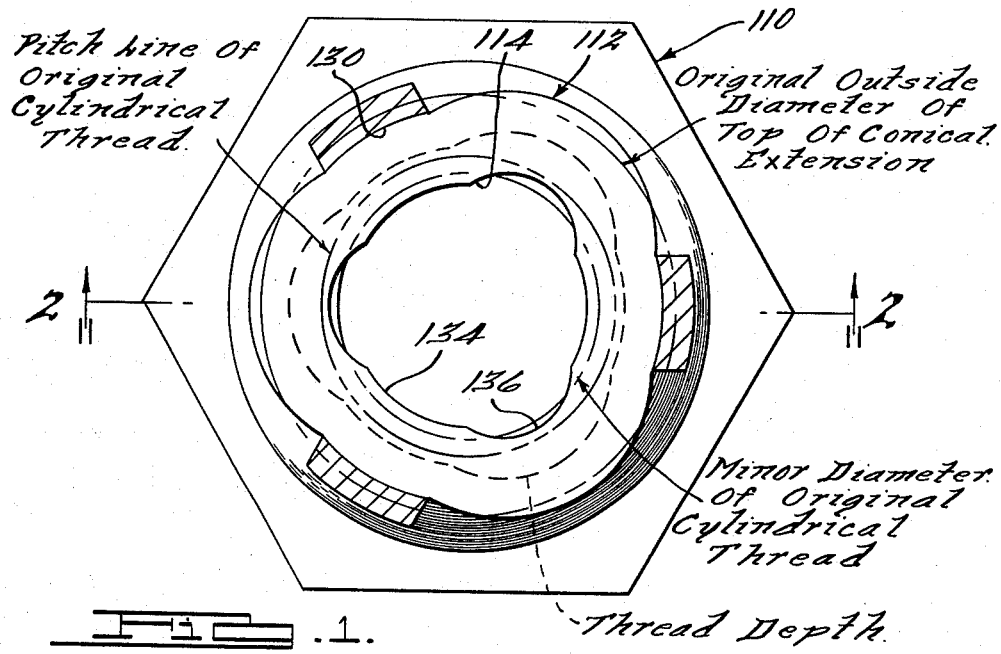
Figure 1 is a top plan view of a nut which may be manufactured with the tool embodying the present invention, showing the effect upon the nut thread produced by the lands of the forming tool, the lands appearing conventionally in section.
Figure 2:
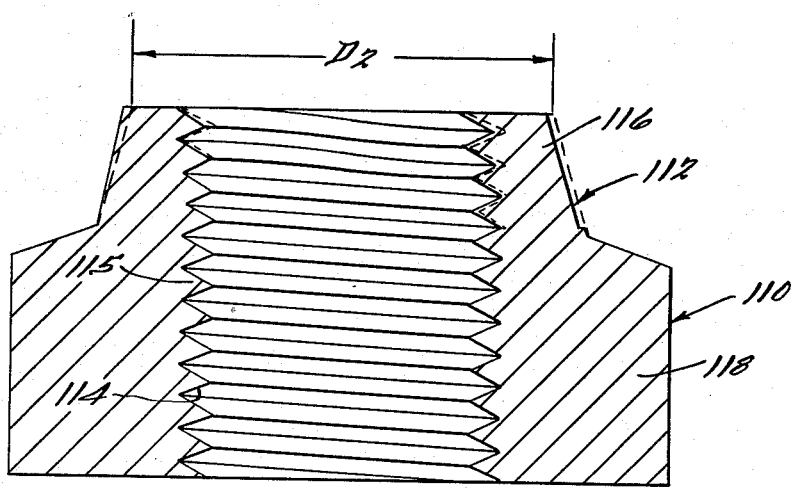
Figure 2 is an axial sectional view of the nut illustrated in Fig. 1, taken on the line 2—2 thereof.

Referring to the drawings, a self-locking nut which may be manufactured with the tool of the present invention is illustrated in Figs. 1 and 2 and is comprised of a polygonal body portion 110 having an integral frusto-conical axial extension 112, the body portion 110 and the frusto-conical axial extension 112 defining a bore 114 having an internal thread 115. The wall 116 of the extension 112 is continuous and of a thickness appreciably less than the thickness of the wall 118 of the body portion 110 of the nut so that the extension 112 has considerable resiliency which is greatest at the end of the extension remote from the body portion. In the initial stages of formation, the pitch line of the internal thread 115 in the bore 114 defines a right circular cylinder which is concentric with the axis of the bore, and the original external diameter of the conical extension is of an extent indicated by the dotted lines in Fig. 1. At this stage, the nut is not deformed in any way.

The extension 112, viewed in plan, is shaped to the configuration shown in Fig. 1 by means of a forming tool head 120 which is mounted in a reciprocal holder 122 and which is adapted to be forced axially over the outer end of the frusto-conical extension 112 of the nut while the body portion 110 of the nut is mounted on a fixed support 124, as shown in Fig. 3. The tool head 120 is formed with an axial bore 126 opening to a tapered counterbore 128 generally complemental to the frusto-conical extension of the nut. As shown in Fig. 4, the tapered counterbore may be formed with three equidistantly spaced and generally axially extending lands 130 which are disposed on the surface of a right circular cone the axis of which coincides with the axis of the tool bore 126, each land 130 subtending an angle of approximately 35° or sufficient angular extent to produce the compression of the extension 112 hereinafter described. The minimum diameter of the counterbore 128, expressed as the diameter of the circle on which lie the arcs at the inner ends of the lands 130, is smaller than the original outside diameter of the free end of the extension 112 of the nut to an extent sufficient to displace radially inwardly, circumferentially spaced, arcuate portions of the extension 112 by a distance less than the thread depth of the original normal cylindrical thread.

The counterbore 128 of the tool head 120 is further provided with arcuate clearance depressions 132 between the lands 130, the depressions 132 being formed by milling or otherwise removing the material of the tool head. Each depression 132 is cut out preferably on the arc of a circle having a center radially and outwardly offset from the axis of the counterbore 128 of the tool head with a radius smaller than the radii of the lands 130 and of substantially uniform depth from end to end whereby the extension 112 of the nut, under the pressure of the tool head, will be afforded clearance for the outward flow or displacement of metal of the extension occasioned by its compression through the action of the lands 130.

When the tool head 120 is forced axially over and upon the extension 112 of an axially aligned nut by pressure means as indicated in Fig. 3, the lands 130, shown in section in Fig. 1, press circumferentially spaced portions of the extension 112 radially inwardly to the configuration shown to form circumferentially spaced pressure sectors 134. This deformation of the nut extension 112 forces the material of the nut extension between the sectors 134 radially outwardly into the tool clearance depressions 132 to form arcuate relief sectors 136 intermediate the pressure sectors 134. This feature improves to a great extent the resiliency of the deformed portion of the extension. Since the deformed portion of the extension fills out completely the inner contour of the counterbore of the tool head, definite control over the uniformity of the deformation is assured with a consequent uniform result in the performance of the nut.

With reference to Figs. 1 and 2, it will be seen that the finished nut has at the top portion of the extension, as viewed in Fig. 2, an equidistantly spaced, circumferentially extending series of locking pressure sectors 134 on which the portions of the initially cylindrical thread 115 are projected radially inwardly into the bore so that the generally spiralling pitch lines of such portions of the thread closely approach arcs of a circle concentric with but of smaller diameter than the circle of the cylinder defined by the pitch line of the remaining portions of the thread, the pressure sectors being separated by the intervening curvilinear relief sectors 136 which extend radially outwardly with respect to the cone on which the crests of the thread of the pressure sectors lie. The relief sectors provide sufficient clearance space for the metal of the pressure sectors when the latter are placed under compression in service so as to avoid a detrimentally high frictional contact and torque. By reason of the dimensions of the counterbore, the minor diameter of the portions of the thread on the arcuate pressure sectors will, at the top face of the nut as viewed in Fig. 2 be smaller than the minor thread diameter of the original cylindrical thread by a distance less than the cylindrical thread depth.

The dotted lines appearing in Fig. 2 indicate the shape of the extension of the nut in axial section prior to deformation by the shaping tool, and its shape after deformation is shown in full lines. The outward displacement of the relief sectors increases gradually from a minimum at the junctions of the relief sectors with the pressure sectors to a maximum midway between the pressure sectors. Therefore, in a service application of the nut, the leading end of the portion of the thread on each pressure sector is gradually cammed into pressure contact with the adjacent thread of the screw by the progressive approach of the trailing part of the relief sector toward the axis of the nut and to a point where it joins the leading end of the pressure sector. This is illustrated in Fig. 1.

The present invention also provides a substantially full flank contact of the portions of the thread on the pressure sectors with the complemental and mating flank areas of the thread of the screw over a large area and, as illustrated herein, totals approximately 180° or approximately one half of one convolution of the thread plus such further degrees of flank contact as may be occasioned by the mating of the displaced or flowed metal. Since the extension 112 is relatively resilient and since the engaging surface of each pressure sector closely approaches the arc of a circle that is concentric to the thread circle of the mating thread with which it is engaged locking action is obtained without thread galling, distortion or other damage. Thus, it will be appreciated that the locking pressure is distributed evenly over a relatively large area and is not localized at a small area or point.

Full and uniform concavity of the pressure sectors so as to closely approach arcs of a circle concentric with the thread circle of a mating thread element is obtained and assured through the distortion relief afforded by the clearance depressions in the counterbore when the outer end of the extension is deformed by the shaping tool. The radial inward displacement of the pressure sectors 134 and the outward radial displacement of the arcuate relief sectors 136 under the action of the tool head 120 and its tapered counterbore 128 gradually diminishes from the free end of the extension 112 until they meet and unite with the original cylindrical threads, as shown in Fig. 2.

The three pressure sectors 134 and an equal number of intervening relief sectors 136 symmetrically arranged and as described herein furnish a good balance of proportion and pressure with a satisfactory amount of expansion and contraction of the metal. It will be understood, however, that the present invention is not limited to a tool for making a particular number of pressure sectors with a particular number of intervening relief sectors, as previously mentioned, and that the tool may be readily adapted to form greater or lesser number of pressure sectors on the nut.

A practical application of the invention is indicated by the following: assuming that a nut is to be fabricated for a ¼–20 screw, the rough nut blank may be fashioned from metal commonly used in the manufacture of standard nuts and is formed with the usual wrench faces as a part of the body portion 110 of the nut and with a frusto-conical extension, as shown in Fig. 2, with an included angle of the order of 25°. The nut blank so formed is bored and then tapped axially throughout its overall height with a ¼–20 pitch internal thread.

The tool head 120 is preferably formed from a material known in the trade as oil hardened tool steel or sintered carbide in order to insure continued accuracy and a relatively long tool life.

In forming the tool head 120 for the shaping of the nut extension 112, it is axially bored as at 126 with a $17/64$ inch drill to a depth A of approximately five-sixteenths of an inch, following which it is provided with a frusto-conical counterbore.

The lands 130 of the counterbore of the forming tool head, which are pressed upon the outer end of the tapered or conical nut extension 112 have an included angle B of the order of 38°. With this included angle of 38°, the diameter C of the counterbore at its wide end is of the order of .335 inch.

As shown in Fig. 6, the depressions into which the outwardly displaced metal of the nut extension between the sectors 134 is forced may have a depth E of .015 to .020 at its deepest point to assure clearance space and may be conveniently formed with a .281 diameter cutter having a 38° included angle.

For test purposes, a ball F having a diameter of .3125 inch may be inserted in the tapered counterbore and if the counterbore is accurately formed the distance G between the bottom of the ball and the outer face of the tool heads normal to its axis will be of the order of .32 inch.

The height of the extension of the nut may be of the order of .095 inch and the original outside diameter $D_2$ of the top of the extension may be of the order of .310 inch plus or minus .005 inch.

The taper of the counterbore 128 and the taper of the conical nut extension 112 is such that the tool counterbore is brought into contact with the tapered wall of the extension when about 25% of the axial length of the counterbore has passed over the outer end of the extension. The distance which the counterbore travels in contact with the tapered wall of the extension may be variable so as to vary the extent of inward displacement of the pressure sectors of the nut, thereby permitting an increase or decrease of frictional contact between the portions of the thread on the pressure sectors and the thread of the screw, as conditions may require.

While a preferred embodiment of the invention has been shown and described, it will be understood that various changes and modifications may be made without departing from the spirit of the invention.

What is claimed is:

1. A tool for axial pressure application over and upon a frusto-conical extension of a nut to render the nut self-locking, said tool including a head having an uninterrupted wall defining a tapered recess open at one end of said head, the recess defined by said wall being generally complemental to the extension of the nut which the tool is adapted to render self-locking, said wall defining said recess having angularly spaced arcuate land portions the center of curvature of the inner faces of which coincide with the longitudinal axis of the recess, said wall also having angularly spaced arcuate relief portions defining radially outwardly extending depressions separating said land portions, the center of curvature of the inner surfaces of each of said relief portions being radially outwardly offset from the said center of curvature of said land portions, the volume of said recess defined by said wall including said depressions being such that said recess is completely filled out by the frusto-conical extension of the nut when the tool is moved axially thereover.

2. A tool for axial pressure application over and upon a frusto-conical extension of a nut to render the nut self-locking, said tool including a head having an uninterrupted wall defining a tapered recess open at one end of said head, the recess defined by said wall being generally complemental to the extension of the nut which the tool is adapted to render self-locking, said wall defining said recess having circumferentially spaced arcuate land portions the center of curvature of the inner faces of which coincide with the longitudinal axis of the recess, said wall also having spaced arcuate relief portions defining radially outwardly extending depressions separating said land portions, the center of curvature of the inner surfaces of each of said relief portions being radially outwardly offset from the said center of curvature of said land portions, each of said relief portions being in diametrical opposition to a land portion, the volume of said depressions defined by said relief portions of said wall being such that said depressions are completely filled out by the frusto-conical extension of the nut when the tool is moved axially thereover.

References Cited in the file of this patent

UNITED STATES PATENTS

| | | |
|---|---|---|
| 1,903,922 | Rupf | Apr. 18, 1933 |
| 2,337,797 | Brackett | Dec. 28, 1943 |
| 2,586,786 | Cole | Feb. 26, 1952 |
| 2,679,879 | Engstrom | June 1, 1954 |